United States Patent
Song

(10) Patent No.: US 8,267,141 B2
(45) Date of Patent: Sep. 18, 2012

(54) HEAT INSULATOR MANUFACTURING SYSTEM AND METHOD

(76) Inventor: Jeong Gon Song, Gyeongsan-shi (KR)

(*) Notice: Subject to any disclaimer, the term of this patent is extended or adjusted under 35 U.S.C. 154(b) by 0 days.

(21) Appl. No.: 12/952,151

(22) Filed: Nov. 22, 2010

(65) Prior Publication Data

US 2011/0061794 A1 Mar. 17, 2011

Related U.S. Application Data

(60) Provisional application No. PCT/KR2010/001064, filed on Feb. 22, 2010.

(30) Foreign Application Priority Data

Apr. 6, 2009 (KR) .................. 10-2009-0029449
Feb. 3, 2010 (KR) .................. 10-2010-0009964

(51) Int. Cl.
| B29C 65/00 | (2006.01) |
| B32B 37/00 | (2006.01) |
| B32B 38/04 | (2006.01) |
| B32B 39/10 | (2006.01) |

(52) U.S. Cl. ........ 156/514; 156/470; 156/517; 156/555; 156/498; 156/494; 156/252; 156/211; 156/257; 156/268; 156/197

(58) Field of Classification Search .................. 156/252, 156/253, 256, 257, 268, 160, 164, 197, 199, 156/211, 470, 494, 513, 514, 517, 555, 498
See application file for complete search history.

(56) References Cited

U.S. PATENT DOCUMENTS

| 2,196,006 | A | * | 4/1940 | Benedict | 156/201 |
| 3,575,027 | A | * | 4/1971 | Eisler | 72/186 |
| 3,823,047 | A | * | 7/1974 | Colombo | 156/309.9 |
| 3,864,198 | A | * | 2/1975 | Jackson | 57/259 |
| 3,885,074 | A | * | 5/1975 | Chandler | 428/136 |
| 3,945,868 | A | * | 3/1976 | Menzies | 156/164 |
| 4,032,689 | A | * | 6/1977 | Johnson et al. | 428/55 |
| 4,033,802 | A | * | 7/1977 | Culpepper et al. | 156/71 |
| 4,088,723 | A | * | 5/1978 | Norton | 264/45.5 |

(Continued)

FOREIGN PATENT DOCUMENTS

KR 20-0254604 11/2001

(Continued)

*Primary Examiner* — Linda L Gray
(74) *Attorney, Agent, or Firm* — Lower Hauptman Ham & Berner, LLP

(57) ABSTRACT

Disclosed are an apparatus and a method for manufacturing a heat insulator, including: a frame having a feeder provided at front side of the frame for feeding a cross-linked foam polyethylene sheet and a winder provided at rear side of the frame for winding a completed heat insulator; a cutting part provided at a leading side of the frame, a widening part provided at a rear side of the cutting part, which is for transforming the cutoff slots into cells by widening a width of the cross-linked foam polyethylene sheet formed with the cutoff slots; a cooling part provided at a rear side of the widening part, which has cooling rollers to continuously maintain a widened width of the cross-linked foam polyethylene sheet and a shape of the cells transformed from the cutoff slots; and a sheet-attaching part provided at a rear side of the cooling part.

14 Claims, 13 Drawing Sheets

U.S. PATENT DOCUMENTS

| | | | | |
|---|---|---|---|---|
| 5,415,715 | A * | 5/1995 | Delage et al. | 156/197 |
| 5,612,111 | A * | 3/1997 | Lin | 428/71 |
| 5,624,622 | A * | 4/1997 | Boyce et al. | 264/258 |
| 5,843,353 | A * | 12/1998 | De Vos et al. | 264/102 |
| 5,975,180 | A * | 11/1999 | Durinck | 156/510 |
| 6,183,837 | B1 * | 2/2001 | Kim | 428/118 |
| 6,630,221 | B1 * | 10/2003 | Wong | 428/117 |
| 6,743,483 | B2 * | 6/2004 | Rochefort et al. | 427/483 |
| 7,727,587 | B2 * | 6/2010 | Kaspersion | 427/243 |
| 7,842,147 | B2 * | 11/2010 | Shen et al. | 156/83 |
| 2011/0081514 | A1 * | 4/2011 | Day et al. | 428/53 |

FOREIGN PATENT DOCUMENTS

| | | |
|---|---|---|
| KR | 10-0573059 | 4/2006 |
| KR | 10-0647221 | 11/2006 |
| KR | 10-0828630 | 5/2008 |

* cited by examiner

HEAT INSULATOR MANUFACTURING SYSTEM AND METHOD

BACKGROUND OF THE INVENTION

1. Field of the invention

The present invention relates to a heat insulator manufacturing system and a method thereof, and more particularly to a heat insulator manufacturing system and a method thereof, in which the heat insulator can show high reflectivity and low emissivity by being used alone or being used in combination with other materials.

2. Description of the Prior Art

A heat insulator is generally attached and constructed on the outer wall surface of a building, which performs a role of minimizing the loss of indoor cool/warm air by preventing cool air or warm air from incoming from the outside to the inside of the building, and preventing warm air or cool air within the building, from leaking to the outside Various kinds of such heat insulators have been conventionally developed and used, and the applicant of the application also has registered a heat insulator as Korean Utility Model Registration No. 420049. Hereinafter, the configuration of a heat insulator employing such a preceding technology will be described with reference to FIG. 13.

A heat insulator 1 employing a conventional technology includes a first insulating layer 2 formed by non-woven fabric, a second insulating layer 3 adhered on one surface of the first insulating layer 2 by a cross-linked foam material, a third insulating layer 5 having multiple air cells 4, provided on the other surface of the second insulating layer 3, and aluminum films 6 attached on outer surfaces of the first and third insulating layers 2 and 5.

The above described conventional heat insulator has a form in which highly-adiabatic ready-made materials, such as an air gap, a non-woven fabric, and a cross-linked foam sheet, are simply adhered by adhesive or resin, and aluminum films are adhered on both surfaces of them. Thus, a manufacturing apparatus is configured in such a manner that roll-type materials are simply fed, and the fed materials are adhered by a pressing roller.

Of course, in the configuration of such a heat insulator, as required, an aluminum film having high reflectivity and low emissivity is intervened between insulator materials to improve the adiabaticity. However, in actuality, such configuration causes an unnecessary waste of aluminum films.

This is because in a case of an aluminum film, in order to utilize aluminum's own characteristics, such as high reflectivity (cutting off of an inflow from outside to inside) and low emissivity (cutting off of an outflow from inside to outside) to the maximum, the surface of the aluminum film has to be attached with no extraneous matter.

For this reason, in the configuration of an insulator, aluminum films are attached to both sides. Also, an aluminum film positioned at the outside of a constructed insulator performs a high-reflectivity function, and another aluminum film positioned at the inside performs a low-emissivity function.

Although such a fact is known to all people engaged in the technology field of a heat insulator, the intervention of an aluminum film between respective components constituting the heat insulator is mainly intended to technically differentiate from other heat insulators.

SUMMARY OF THE INVENTION

Accordingly, the present invention has been made to solve the above-mentioned problems occurring in the prior art, and the present invention provides a heat insulator manufacturing system and a method thereof, in which the heat insulator is manufactured by the steps of forming cutoff slots in a cross-linked foam polyethylene sheet, widening the width of the cross-linked foam polyethylene sheet formed with cutoff slots while forming cells, and attaching an aluminum film on both surfaces of the cross-linked foam polyethylene sheet formed with the cells. The heat insulator can be used alone. Meanwhile, even though the heat insulator is used by being intervened within other components, the aluminum film positioned over cells formed in the cross-linked foam polyethylene sheet has no adhesive surface. Thus, it is possible to sufficiently show high reflectivity and low emissivity.

In the present invention, to both surfaces of a cross-linked foam polyethylene sheet formed with cells in a range of 60 to 80% with respect to the entire area, a heat insulator attached with an aluminum film is provided. Thus, the heat insulator can sufficiently show high reflectivity and low emissivity, that is, the aluminum film's own characteristics, by being used alone or being intervened within components of the heat insulator. Accordingly, it is possible to achieve various effects, such as an improvement of the adiabaticity, an improvement of the quality of the heat insulator, and superiority in competitive power overseas.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EXEMPLARY EMBODIMENTS

Figure 1:
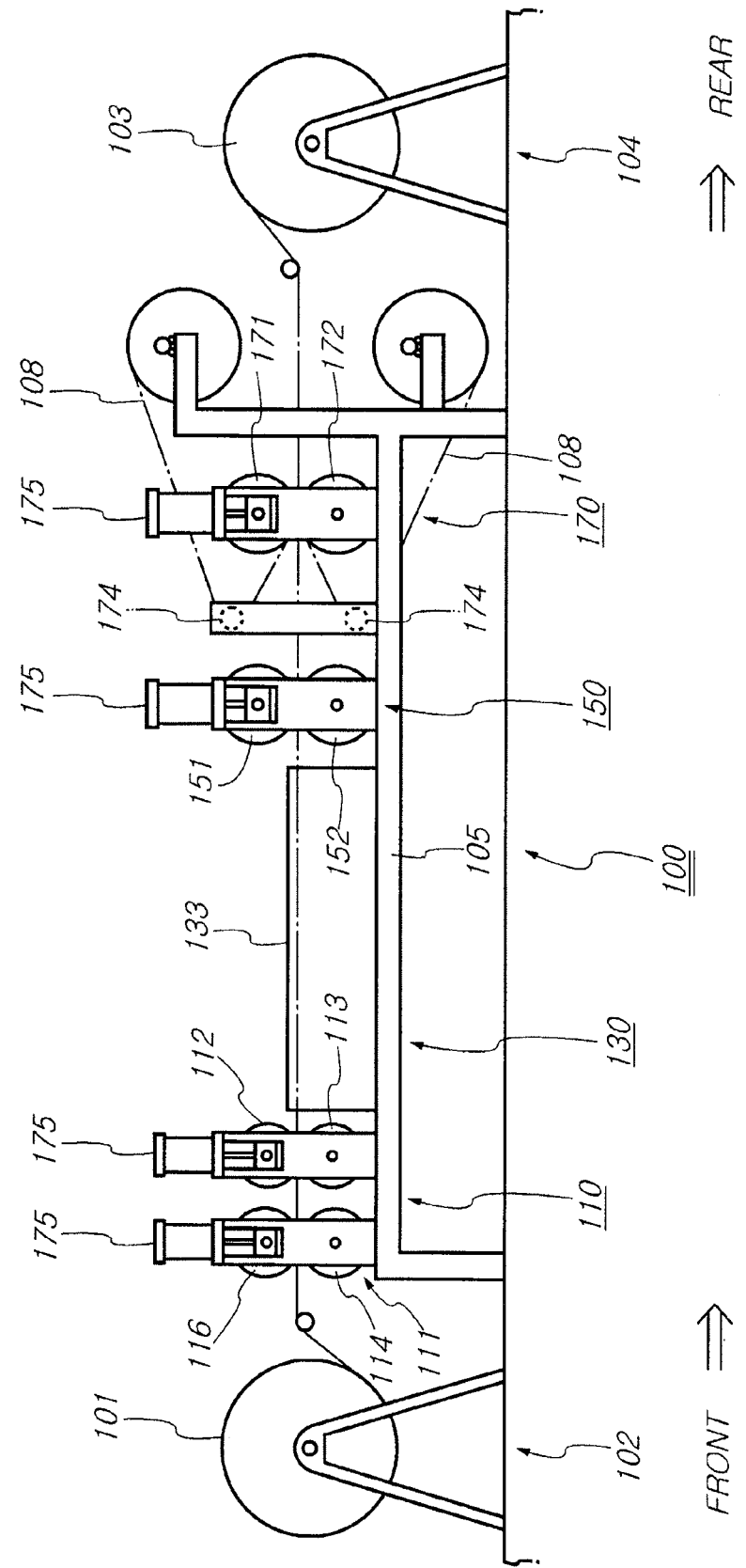
FIG. 1 is a lateral configuration view showing an entire heat insulator manufacturing apparatus according to the present invention.
Figure 2:
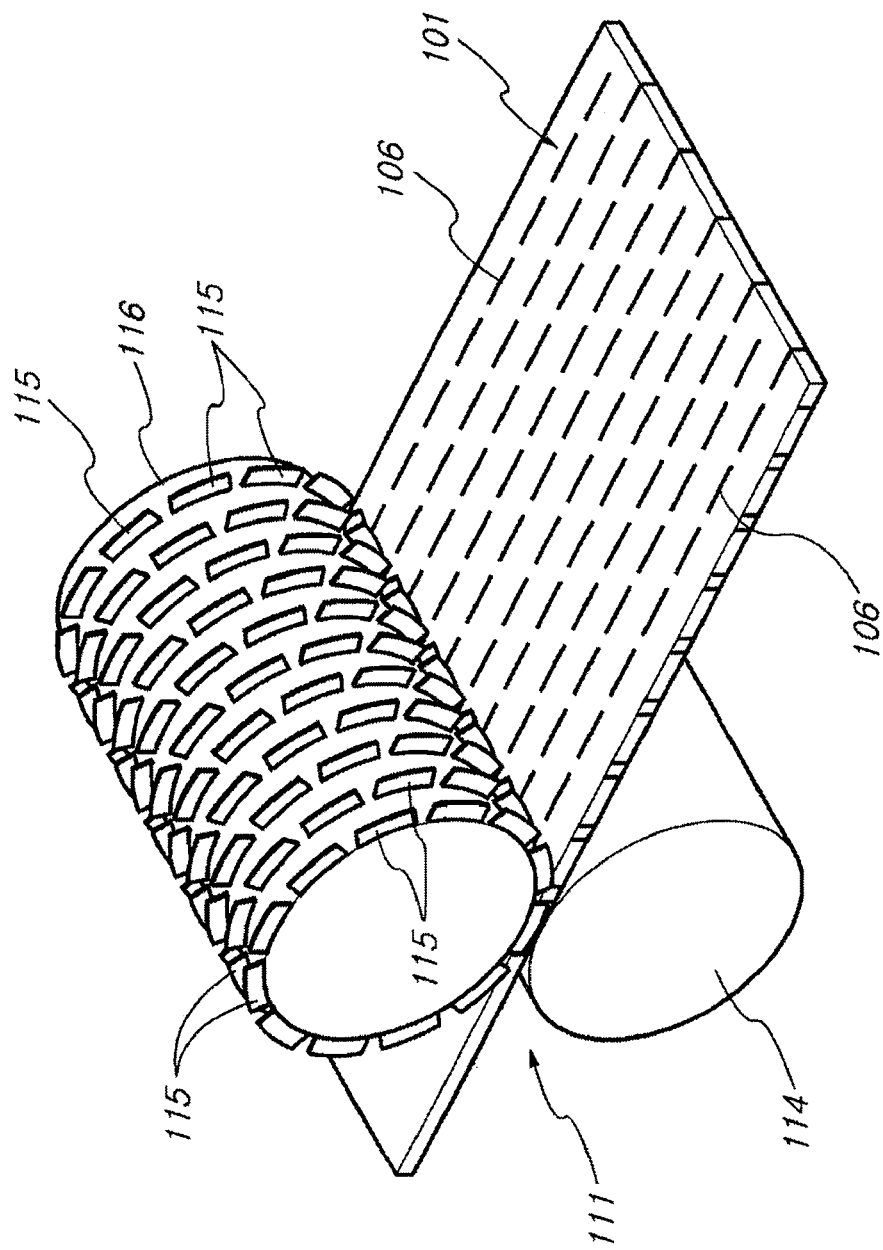
FIG. 2 is a perspective view showing a cutting part of a heat insulator manufacturing apparatus according to the present invention.
Figure 3:
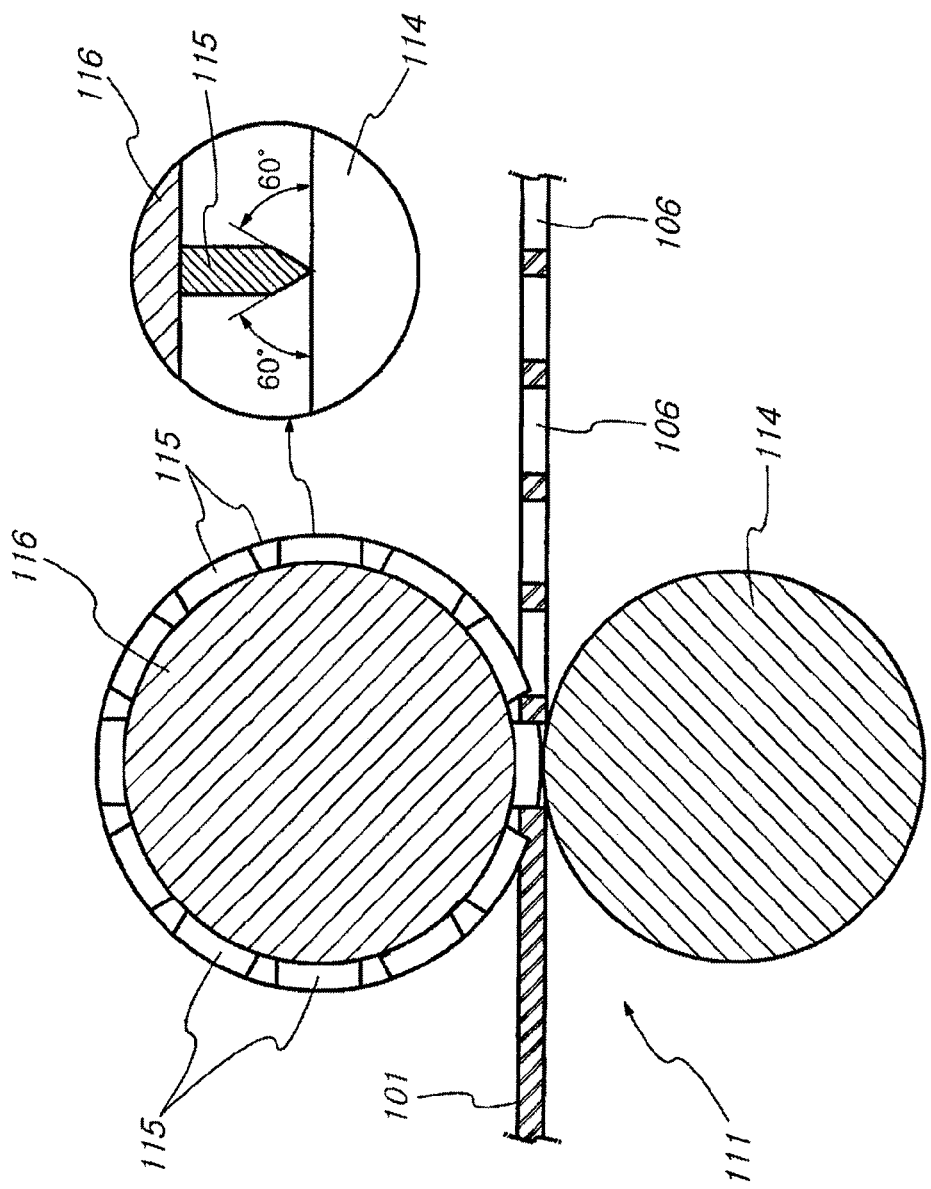
FIG. 3 is a cross-sectional view showing a cutting part of a heat insulator manufacturing apparatus according to the present invention.
Figure 4:
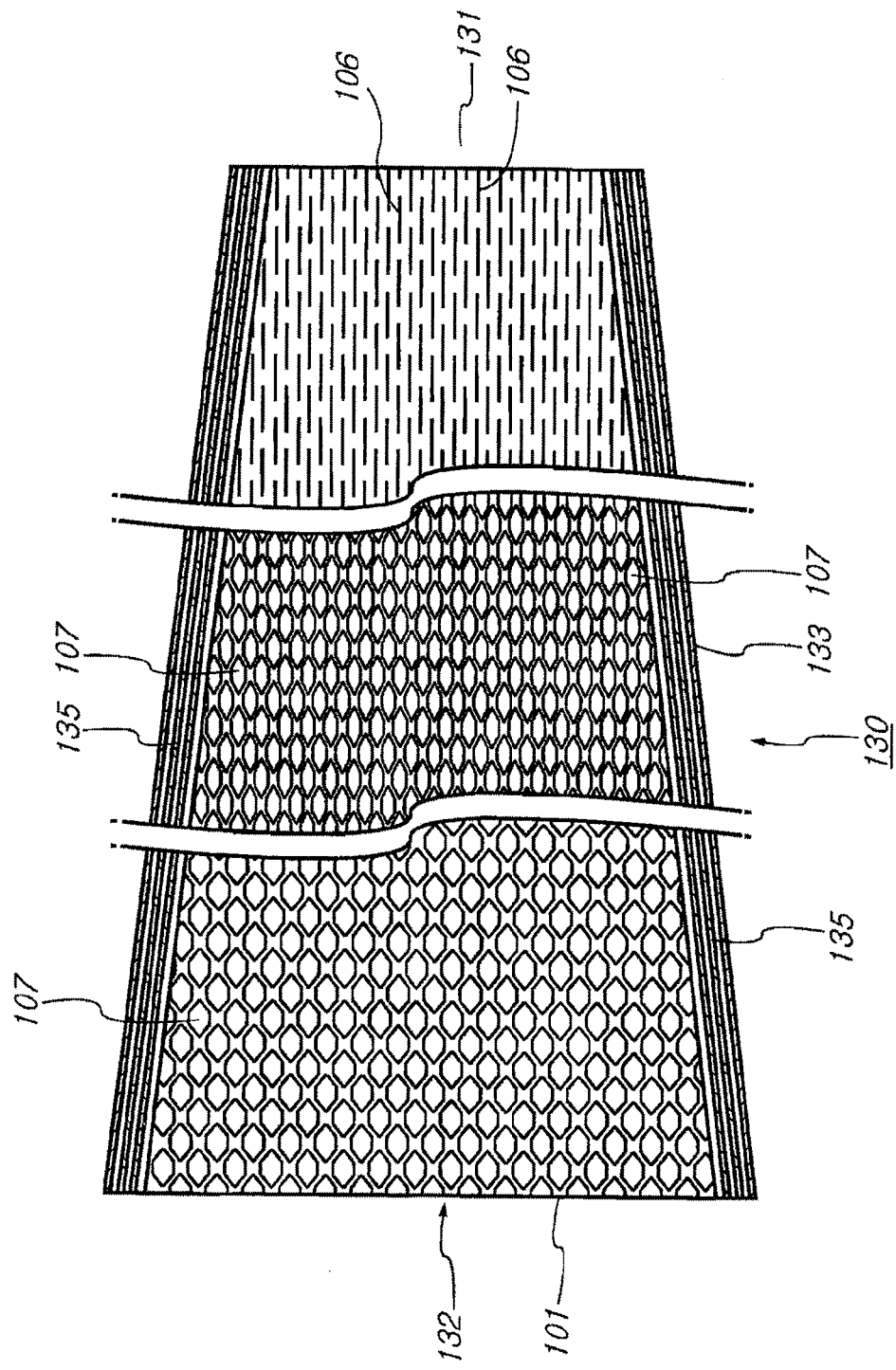
FIG. 4 is a plan cross-sectional view showing a widening part of a heat insulator manufacturing apparatus according to the present invention.
Figure 5:
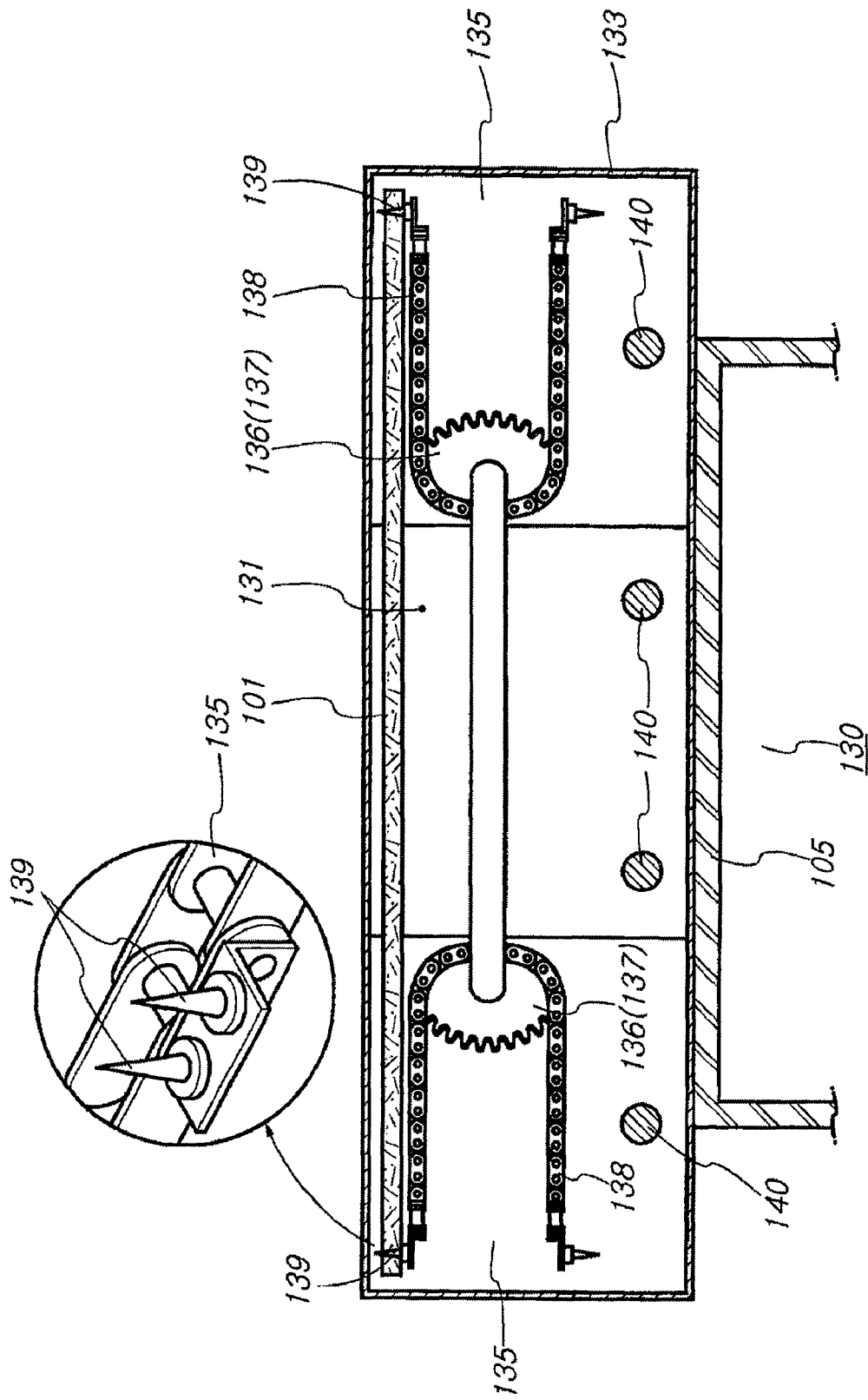
FIG. 5 is a lateral cross-sectional view showing a widening part of a heat insulator manufacturing apparatus according to the present invention.
Figure 6:
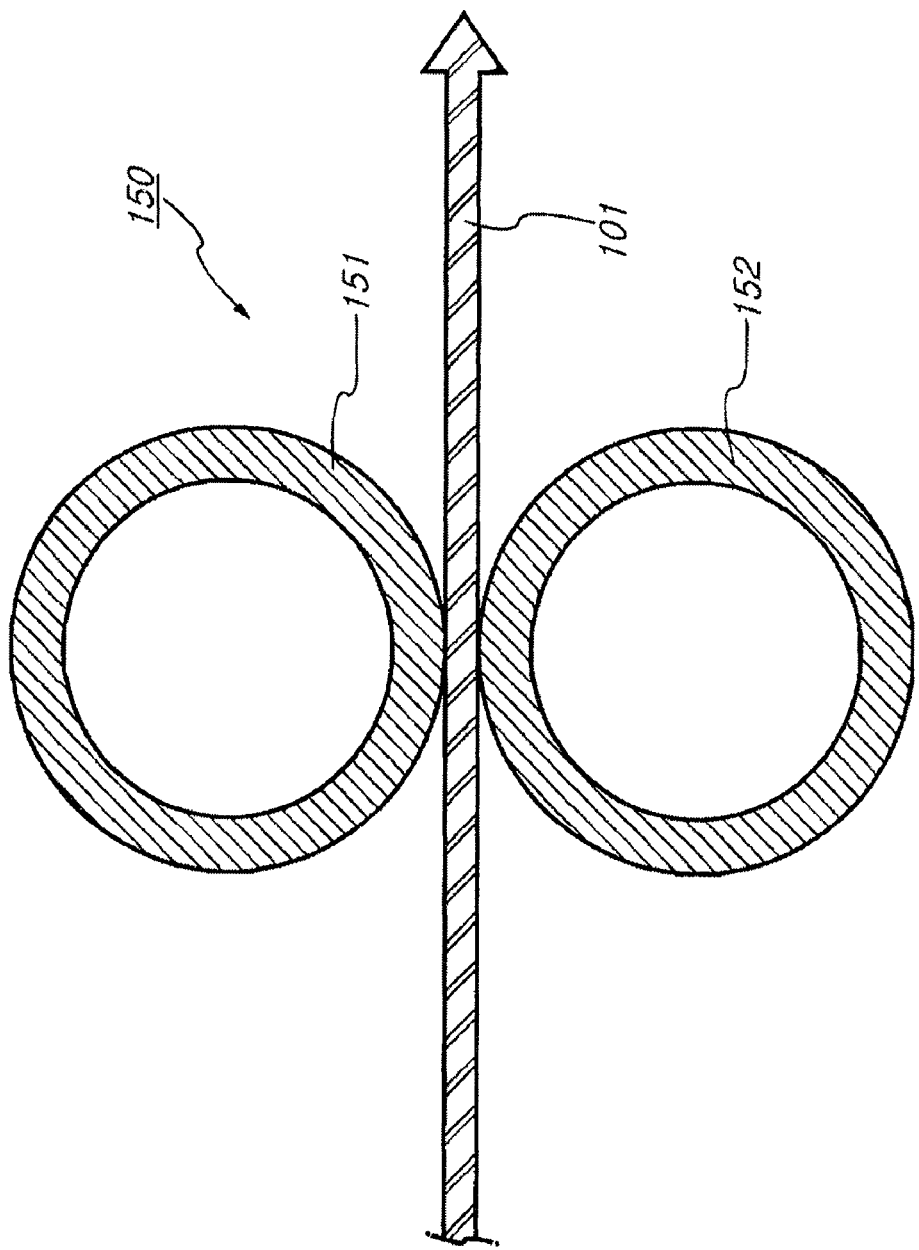
FIG. 6 is a cross-sectional view showing a cooling part of a heat insulator manufacturing apparatus according to the present invention.
Figure 7:
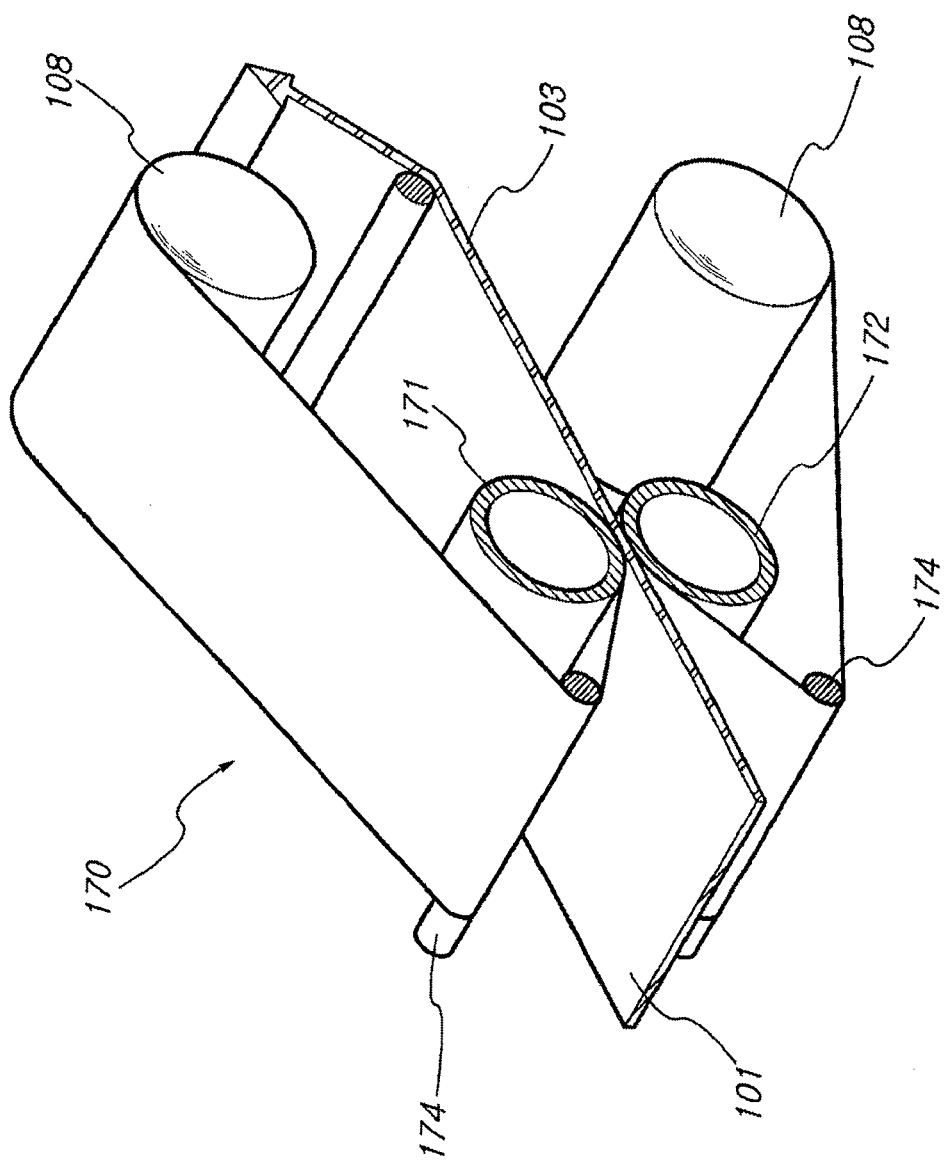
FIG. 7 is a perspective view showing a sheet-attaching part of a heat insulator manufacturing apparatus according to the present invention.
Figure 8:
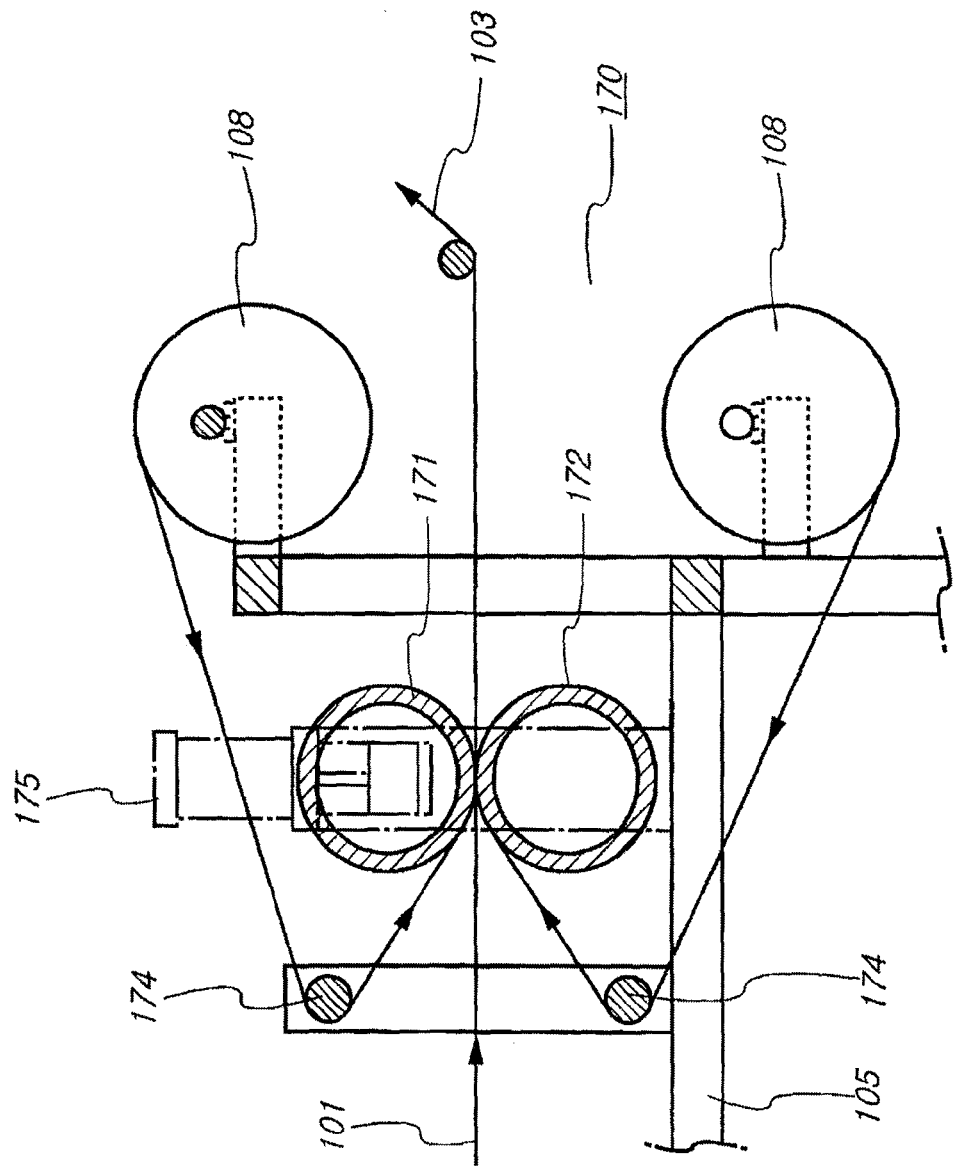
FIG. 8 is a cross-sectional view showing a sheet-attaching part of a heat insulator manufacturing apparatus according to the present invention.
Figure 9:
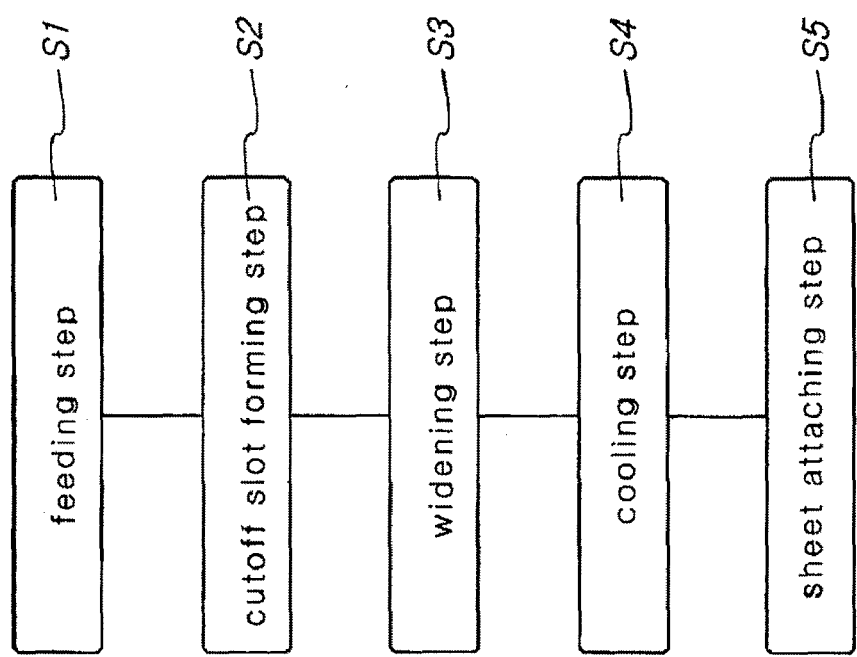
FIG. 9 is a flow chart showing a process of manufacturing a heat insulator by a heat insulator manufacturing apparatus according to the present invention.
Figure 10:
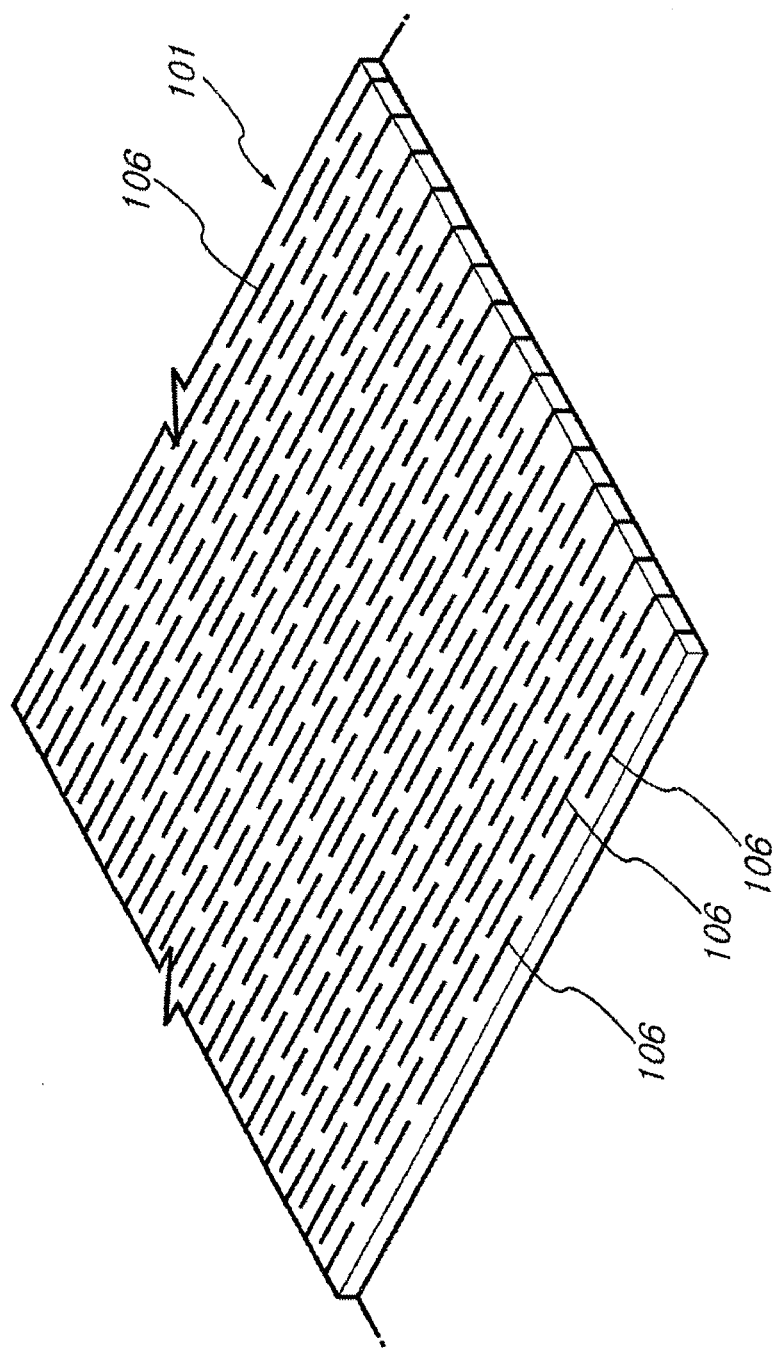
FIG. 10 is a perspective view showing a cross-linked foam polyethylene sheet formed with cutoff slots by a heat insulator manufacturing apparatus according to the present invention.
Figure 11:
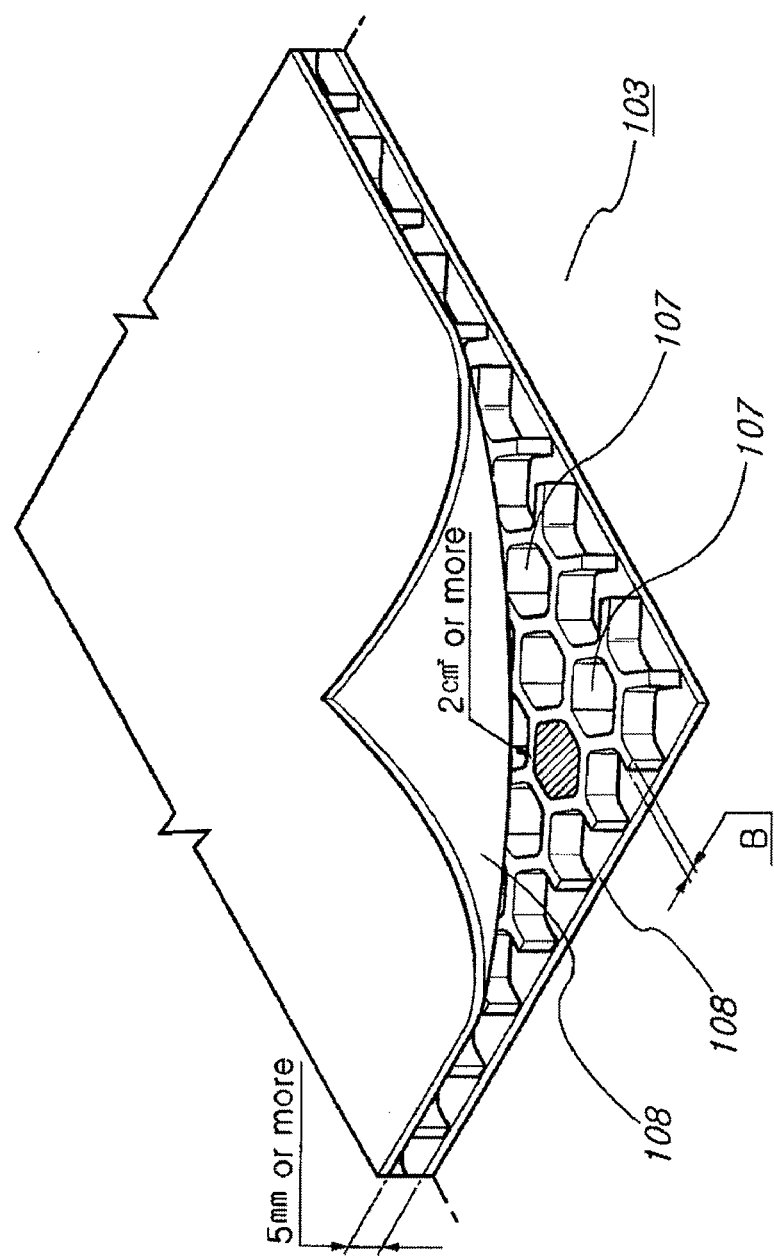
FIG. 11 is a perspective view showing a heat insulator completed by a heat insulator manufacturing apparatus according to the present invention.

A cross-linked foam polyethylene sheet 101 to be processed is prepared and fed, and the fed cross-linked foam polyethylene sheet 101 is formed with multiple cutoff slots 106 with equal spacing.

The cross-linked foam polyethylene sheet 101 formed with the cutoff slots 106 is heated so that its width is widened, thereby transforming the cutoff slots 106 into the shapes of cells 107. Then, the cross-linked foam polyethylene sheet 101 is cooled in order to maintain the state where the width of the cross-linked foam polyethylene sheet 101 and the cells 107 are widened.

A heat insulator 103 according to the present invention is characterized in that one surface (or both surfaces) of the cooled cross-linked foam polyethylene sheet 101 is attached with an aluminum film 108 so that high reflectivity and low emissivity, that is, the aluminum film 108's own functions, can be shown through the cells 107.

A heat insulator manufacturing apparatus 100 according to the present invention includes a frame 105 having a feeder 102 provided at front side of the frame for feeding a cross-linked foam polyethylene sheet 101 and a winder 104 provided at rear side of the frame for winding the completed heat insulator 103.

At the leading side of the frame 105, a cutting part 110 for forming the multiple cutoff slots 106 in the cross-linked foam polyethylene sheet 101 fed from the feeder 102 is provided, while at the rear side of the cutting part 110, a widening part 130 for transforming the cutoff slots 106 into the cells 107 by widening the width of the cross-linked foam polyethylene sheet 101 formed with the cutoff slots 106 is provided.

At the rear side of the widening part 130, a cooling part 150 is provided which is for continuously maintaining the widened width of the cross-linked foam polyethylene sheet 101 and the cells 107 transformed from the cutoff slots 106, while at the rear side of the cooling part 150, a sheet-attaching part 170 is provided, which is for attaching the aluminum film 108 on one surface (or both surfaces) of the widened cross-linked foam polyethylene sheet 101 formed with the cells 107 so as to show high reflectivity and low emissivity.

The cutting part 110 includes: a cutting roller 111 for forming the cutoff slots 106 in the fed cross-linked foam polyethylene sheet 101; and a pair of upper/lower feeding rollers 112 and 113 for feeding the cross-linked foam polyethylene sheet 101 formed with the cutoff slots 106, to the widening part 130, which are provided at the rear side of the cutting roller 111.

The cutting roller 111 includes: a lower roller 114 positioned at the lower side, which is supported by the frame 105; and an upper roller 116 positioned at the upper side of the lower roller 114, which has multiple blades 115 for forming the cutoff slots 106 in the fed cross-linked foam polyethylene sheet 101.

The cutting roller 111 and the upper/lower feeding rollers 112 and 113 are rolled by receiving power of a driving means provided at the bottom surface of the frame 105, the power is transferred to the lower roller 114 of the cutting roller 111 from the driving means, the lower roller 114 transfers the power to the lower feeding roller 112, and the upper roller 116 and the upper feeding roller 113 are rolled by engaging with each other through the medium of the fed cross-linked foam polyethylene sheet 101. This can be said to be a conventional power transferring type.

The lower roller 114 and the cutting roller 111 are spaced apart from each other by the height H of the blades 115 provided to the cutting roller 111. When the thickness of the fed cross-linked foam polyethylene sheet 101 is larger than the height H of the blades 115, the cutoff slots 106 may be formed while being pressed.

The blades 115 are formed at different positions from adjacent blades 115, instead of at the same lines as the adjacent blades 115. Also, the angle of the blades 115 is preferably maintained at an angle of 60° or less with respect to a horizontal plane of the lower roller 114 so as to make it easy to form the cutoff slots and to reduce the wear.

The widening part 130 supports a widening tunnel 133 with a narrow inlet 131 and a wide outlet 132, on the frame 105, and also at both sides of the widening tunnel 133, a transfer means 135 for transferring the discharged cross-linked foam polyethylene sheet 101 by holding both-side edges of the cross-linked foam polyethylene sheet 101 is provided.

In the transfer means 135, a driving chain gear 136 and a driven chain gear 137, provided to be rolled by receiving power of the driving means, are connected to each other by a chain 138, and also the chain 138 has a plurality of pins 139 so as to hold the cross-linked foam polyethylene sheet 101. This widens the width of the cross-linked foam polyethylene sheet 101 from the inlet 131 to the outlet 132.

The widening tunnel 133 is further provided with a heater 140 for generating heat so as to make it easy to transform the cross-linked foam polyethylene sheet 101 whose width is widened from the inlet 131 to the outlet 132 during the transfer.

The heater 140 may be realized in various forms in such a manner that it is provided at any one of the lower side or the upper side of the widening tunnel 133, or provided at both sides.

The cooling part 150 includes a couple of cooling rollers 151 and 152 provided at the rear end of the outlet 132 of the widening tunnel 133. In the cooling rollers, cooling water for cooling the cross-linked foam polyethylene sheet 101 is circulated so as to continuously maintain its widened state and the formed cells 107.

The sheet-attaching part 170 includes a couple of upper/lower heating rollers 171 and 172 for melting the surface of the cross-linked foam polyethylene sheet 101 so as to attach the aluminum film 108 on one surface or both surfaces of the widened cross-linked foam polyethylene sheet 101 formed with the cells 107.

At the upper and lower sides of the rear-end frame 105 of the heating rollers 171 and 172, an aluminum film feeder 173 is provided so as to feed the roll-type wound aluminum film 108 to the front side of the heating rollers 171 and 172, and the aluminum film 108 is fed to one surface or both surfaces of the cross-linked foam polyethylene sheet 101 by way of a guide roller 174 provided at the upper and lower sides of the heating rollers 171 and 172 and is thermally bonded.

The upper roller 116 and the upper feeding roller 113 of the cutting roller 111 and the feeding roller 112, and the cooling roller 151 and the heating roller 171, positioned at the upper side, correspond to the thickness of the fed cross-linked foam polyethylene sheet 101, by a height adjusting means 175.

In the example of the present invention, the height adjusting means 175 can adjust the upper and lower directions by using a cylinder, but it is natural that the height adjusting means 175 can be realized in various forms such as a combination of an adjusting block and a screw.

Hereinafter, a method for manufacturing the heat insulator by using the heat insulator manufacturing apparatus 100 as described above, according to the present invention, will be described.

The method according to the present invention includes a feeding step S1, a cutoff slot forming step S2, a widening step S3, a cooling step S4, and a sheet attaching step S5.

In the feeding step S1, a cross-linked foam polyethylene sheet 101 to be processed is prepared and fed, and in the cutoff slot forming step S2, multiple cutoff slots are formed in the fed cross-linked foam polyethylene sheet 101 with equal spacing.

In the widening step S3, heat is applied on the cross-linked foam polyethylene sheet 101 formed with the cutoff slots so as to widen the width of the sheet and to transform the cutoff slots into cells, and in the cooling step S4, cooling is performed in such a manner that the state where the width and the cells of the cross-linked foam polyethylene sheet 101 are widened can be maintained.

In the sheet attaching step S5 as a completion step of manufacturing, an aluminum film is attached to one surface or both surfaces of the cooled cross-linked foam polyethylene sheet 101 so that high reflectivity and low emissivity, that is, the aluminum film's own functions, can be shown through the cells.

Hereinafter, a process for manufacturing a heat insulator by using the heat insulator manufacturing apparatus 100 will be described in detail in accordance with each of the steps as described above.

After the roll-type cross-linked foam polyethylene sheet 101 is fed to the feeder 102, and the leading end of the sheet is fed to the cutting part 110, the heat insulator manufacturing apparatus 100 is operated. Then, the cross-linked foam polyethylene sheet 101 is sequentially formed with cutoff slots 106 by the cutting roller 111 constituting the cutting part 110 while being transferred to the widening part 130 by the upper/lower feeding rollers 112 and 113.

In the step of forming the cutoff slots 106 on the cross-linked foam polyethylene sheet 101 by the cutting roller 111, the cross-linked foam polyethylene sheet 101 is supported by the lower roller 114, and the upper roller 116 positioned at the upper side of the lower roller 114 is engagedly rolled.

In such a state, the multiple blades 115 provided to the upper roller 116 press the cross-linked foam polyethylene sheet 101 while forming the cutoff slots 106.

When the cross-linked foam polyethylene sheet 101 formed with the cutoff slots 106, as described above, is fed to the widening part 130, it is advanced to the widening tunnel 133 in a state where it is fixed by the transfer means 135 provided within both side edges of the inlet 131 and the outlet 132, and then is transferred in a direction from the inlet 131 to the outlet 132 of the widening tunnel 133.

In this step, the inlet 131 of the widening tunnel 133 has the same width as the cross-linked foam polyethylene sheet 101 while the width of the widening tunnel 133 is widened toward the outlet 132. Furthermore, heat is applied on the cross-linked foam polyethylene sheet 101 by the heater 140 provided in the widening tunnel 133, which provides flexibility, thereby further widening the width.

Of course, herein, the cutoff slots 106 formed in the cross-linked foam polyethylene sheet 101 are widened and transformed into the cells 107. Also, the widened sheet is cooled by passing through the cooling rollers 151 and 152 provided at the outlet 132's side of the widening tunnel 133, which continuously maintains the widened state.

The cross-linked foam polyethylene sheet 101, cooled and widened as described above, is fed to the sheet-attaching part 170. In the sheet-attaching part 170, the aluminum film 108 is attached on one surface or both surfaces of the cross-linked foam polyethylene sheet 101, thereby completing the heat insulator 103. The completed heat insulator 103 is wound on the winder 104.

In the sheet attaching step, the aluminum film 108 in the aluminum film feeder 102 provided in the rear-side frame 105 is fed together with the cross-linked foam polyethylene sheet 101, at the front side of the heating rollers 171 and 172 by way of the guide roller 174, and then is adhered through thermal bonding by the heating rollers 171 and 172.

Of course, optionally, in a case where the aluminum film 108 is adhered on one surface of the cross-linked foam polyethylene sheet 101, the aluminum film 108 is fed to any one of upper and lower aluminum film feeders, while in a case where the aluminum film is adhered on both surfaces, the aluminum film 108 is fed and adhered from the upper/lower aluminum feeders.

As described above, the heat insulator 103 is completed by attaching the aluminum film 108 on the cross-linked foam polyethylene sheet 101, and the completed heat insulator 103 is wound on the winder 104.

Figure 12:
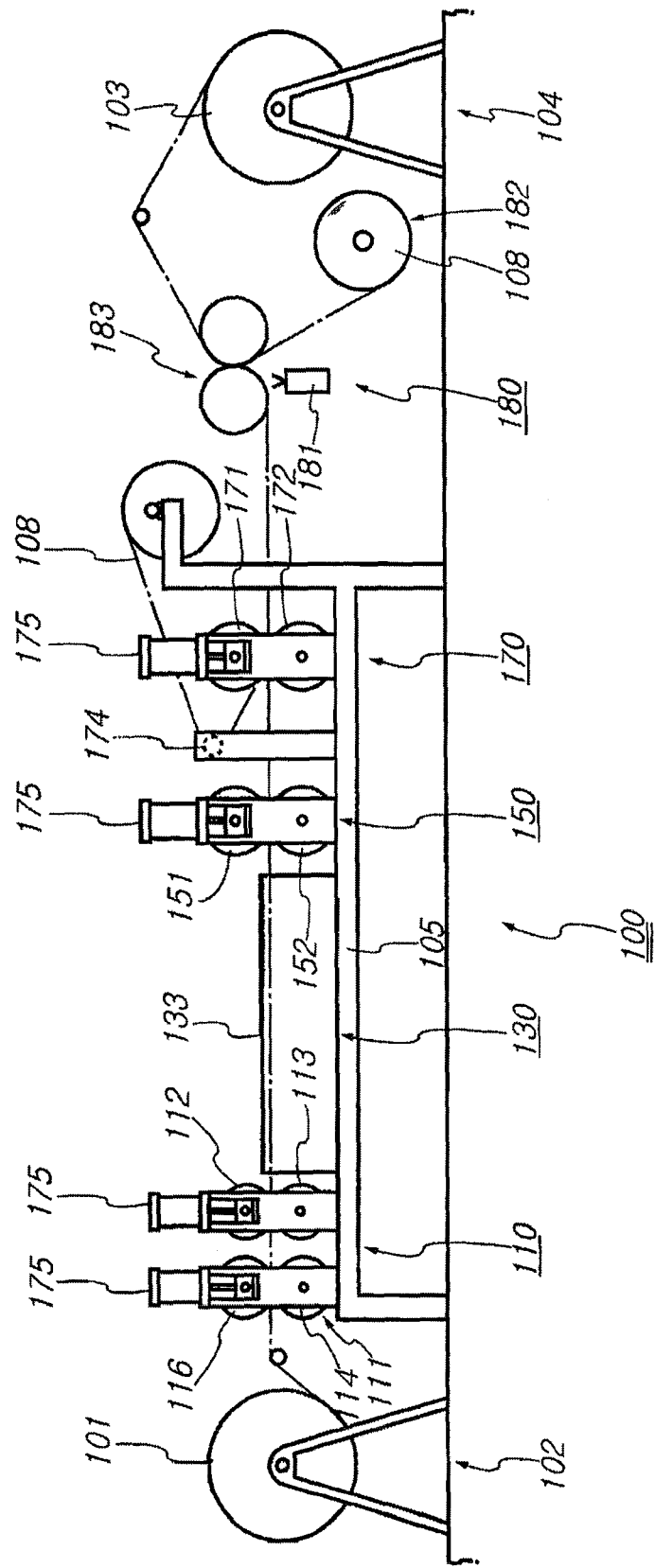
FIG. 12 is a configuration view showing another example of a heat insulator manufacturing apparatus according to the present invention.
Figure 13:
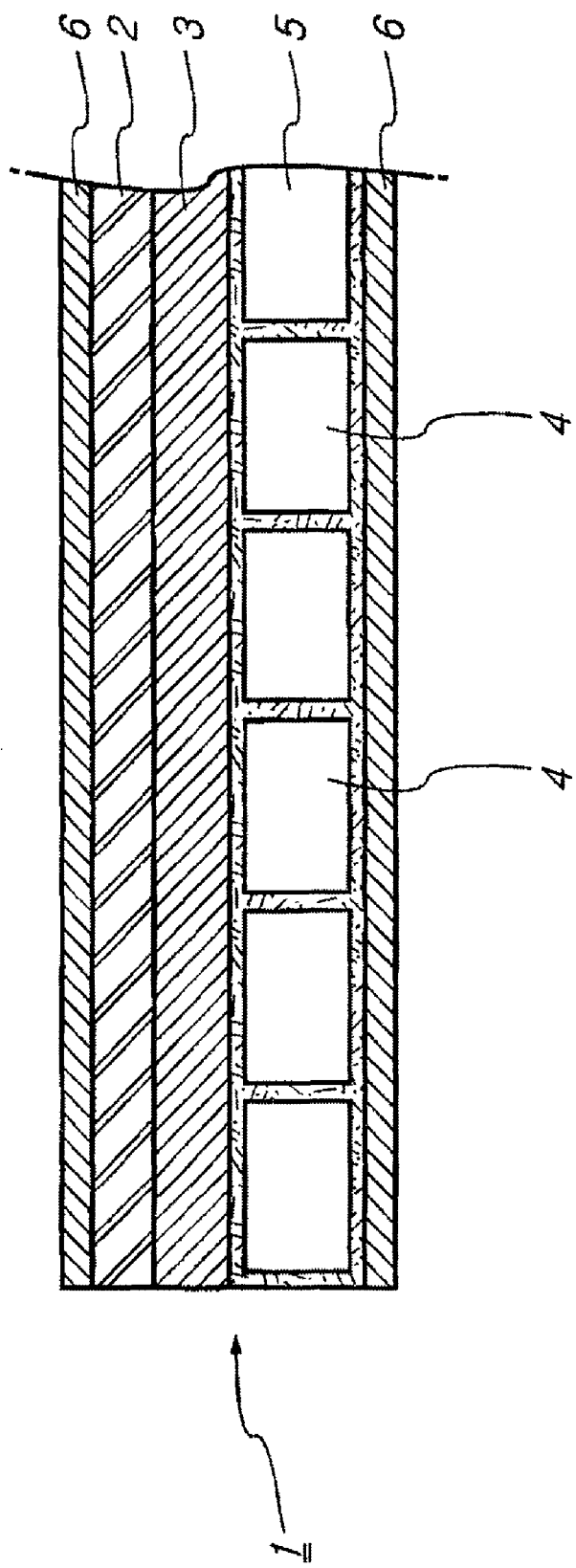
FIG. 13 is a cross-sectional view showing the configuration of a conventional heat insulator.

FIG. 12 is a configuration view showing another example of a heat insulator manufacturing apparatus according to the present invention. The apparatus further includes, at the rear side of the sheet-attaching part 170, a 2-sheet-attaching part 180 for attaching the aluminum film 108 on another surface of the cross-linked foam polyethylene sheet 101 (having the aluminum film 108 attached on one surface thereof through indirect heat by the heating roller 172 constituting the sheet-attaching part 170) by direct heat.

In the 2-sheet-attaching part 180, a burner 181 for applying direct heat on another surface of the cross-linked foam polyethylene sheet 101 (having the aluminum film 108 attached on one surface thereof) drawn out from the sheet-attaching part 170, and thereby melting the surface of the cross-linked foam polyethylene sheet 101 is provided.

Between the rear side of the burner 181 and the winder 104, a couple of sheet-attaching rollers 183 are provided in such a manner that the aluminum film 108 fed through a feeding roll 182 can be attached on the molten surface of the cross-linked foam polyethylene sheet 101.

As the burner 181, a burner using petroleum or gas as heat source is mounted so as to directly apply heat on the surface of the cross-linked foam polyethylene sheet 101. Furthermore, the burner crosses in the width direction of the cross-linked foam polyethylene sheet 101, which allows the heat to be uniformly transferred to the surface of the transferred cross-linked foam polyethylene sheet 101.

The burner 181 is preferably provided below the cross-linked foam polyethylene sheet 101 so as to easily transfer the direct heat to the transferred cross-linked foam polyethylene sheet 101.

Of course, the temperature, the strength, or the like, of the direct heat generated from the burner 181 has to have optimum values in consideration of the velocity or the like of the transferred cross-linked foam polyethylene sheet 101. Also, as the sheet-attaching roller 183, a conventional cooling-roller type roller in which cooling water is circulated is preferably used.

By using the heat insulator 103 manufactured as described above, a test on high reflectivity and low emissivity, that is, the aluminum film 108's own functions, was performed.

As a result, when the thickness of the cross-linked foam polyethylene sheet 101 is very thin, the aluminum films 108 attached on both surfaces are too close to each other to perform their function. Thus, it is preferable that the cross-linked foam polyethylene sheet has a thickness of 5 mm or more, the area and size of the cells 107 formed in the cross-linked foam polyethylene sheet 101 in a widened state have a range of 60 to 80% with respect to $m^1$, and each of the cells 107 has a size of 2 $cm^2$ or more.

When the area of the cells 107 is less than 60% with respect to $m^1$, the aluminum film 108's high reflectivity and low emissivity were not sufficiently shown. Also, in a state where each of the cells 107 has a size of 2 $cm^2$ or less, although the area is in a range of 60 to 80% with respect to $m^2$, the aluminum film 108's high reflectivity and low emissivity were not sufficiently shown.

Also, the width B of a partition wall 185 formed between the cells 107 formed in the cross-linked foam polyethylene sheet 101 is preferably maintained in a range of 3 to 10 mm. When the width B of the partition wall 185 is less than 3 mm, the shape of the cell cannot be maintained.

Contrarily, when the width B of the partition wall 185 is greater than 10 mm, the shape of the cell cannot be maintained. The partition wall performs a role of a heat conductor between the aluminum films attached on both surfaces of the cross-linked foam polyethylene sheet, thereby increasing the heat conductivity. This significantly reduces the function as an insulator.

In another example of the present invention, one surface of the cross-linked foam polyethylene sheet 101 is attached with the aluminum film 108 by using indirect heat (heater) by the sheet-attaching part 170 while another surface is attached with the aluminum film 180 by using direct heat (fire) by the burner 181. Accordingly, the sheet, which has been in a high-temperature state right after the sheet-attachment, is cooled by the sheet-attaching rollers 183 while its temperature is decreased to room temperature. This rarefies the air density within the cells 107, resulting in a vacuum state.

When the inside of the cells is maintained in a vacuum state by rarefying the air density, as described above, there is no convection or conduction by air, and only radiant heat is required to be blocked. Thus, the adiabaticity can be maximized.

Accordingly, the convection or conduction by air is minimized. In other words, in order to inhibit the convection heat generated by the flow of air, the cells are independently formed, and in order to minimize the conduction by air, the air density within the cells is reduced, so that air's resistance against the heat conduction is increased. This makes it possible to improve the adiabaticity.

Also, when the heat insulator 103 manufactured by the present invention is layered in a plurality of layers, the cells 107 of the layered heat insulator are positioned at corresponding positions. Thus, the aluminum film positioned on the cells 107 can maintain a low-emissivity function, and the adiabaticity is increased according to the number of layers.

In the present invention, as described above, a heat insulator, in which an aluminum film is attached on one surface or both surfaces of a cross-linked foam polyethylene sheet formed with cells, may be independently used, or may be used as a component constituting an insulator. In a case where the heat insulator is used as a component by being intervened within an insulator, the aluminum film positioned over cells has no adhesive surface, and thus can show high reflectivity and low emissivity, that is, the aluminum film's own functions. Thus, in the construction of a building, the embedment of the heat insulator in inner/outer wall surfaces of the building can improve the adiabaticity.

Although an exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An apparatus for manufacturing a heat insulator, the apparatus comprising:
   a frame having a feeder provided at front side of the frame for feeding a cross-linked foam polyethylene sheet and a winder provided at rear side of the frame for winding a completed heat insulator;
   a cutting part provided at a leading side of the frame, which is for forming multiple cutoff slots in the cross-linked foam polyethylene sheet fed from the feeder;
   a widening part provided at a rear side of the cutting part, which is for transforming the cutoff slots into cells by widening a width of the cross-linked foam polyethylene sheet formed with the cutoff slots;
   a cooling part provided at a rear side of the widening part, which has cooling rollers to continuously maintain a widened width of the cross-linked foam polyethylene sheet and a shape of the cells transformed from the cutoff slots; and
   a sheet-attaching part provided at a rear side of the cooling part, which is for attaching an aluminum film on at least one surface of the widened cross-linked foam polyethylene sheet formed with the cells so as to show high reflectivity and low emissivity.

2. The apparatus as claimed in claim 1, wherein the cutting part comprises:
   a cutting roller for forming the cutoff slots in the fed cross-linked foam polyethylene sheet; and
   upper/lower feeding rollers provided at a rear side of the cutting roller, which are for feeding the cross-linked foam polyethylene sheet formed with the cutoff slots, to the widening part,
   wherein the cutting roller comprises: a lower roller supported by the frame; and an upper roller positioned at an upper side of the lower roller, which has multiple blades for forming the cutoff slots,
   wherein the blades are formed at different positions from adjacent blades; and an angle of the blades is maintained at an angle of 60° or less with respect to a horizontal plane of the lower roller so as to make it easy to form the cutoff slots and to reduce wear.

3. The apparatus as claimed in claim 2, wherein the upper roller of the cutting roller, the upper feeding roller of the feeding roller, and the cooling roller and the heating roller, positioned at an upper side, correspond to a thickness of the fed cross-linked foam polyethylene sheet, by a height adjusting means.

4. The apparatus as claimed in claim 1, wherein the widening part comprises:
   a widening tunnel with a narrow inlet and a wide outlet, supported by the frame;
   a transfer means provided at both sides of the widening tunnel, which is for transferring the discharged cross-linked foam polyethylene sheet while holding both-side edges of the cross-linked foam polyethylene sheet; and
   a heater provided within the widening tunnel, which is for generating heat so as to make it easy to transform the cross-linked foam polyethylene sheet whose width is widened during transfer.

5. The apparatus as claimed in claim 1, wherein the sheet-attaching part comprises: heating rollers provided to attach the aluminum film on at least one surface of the widened cross-linked foam polyethylene sheet formed with the cells; and an aluminum film feeder provided at upper and lower sides of the frame at a rear end of the heating rollers, which is for feeding the aluminum film to be attached, to upper and lower sides of a front side of the heating rollers.

6. The apparatus as claimed in claim 5, wherein the upper roller of the cutting roller, the upper feeding roller of the feeding roller, and the cooling roller and the heating roller, positioned at an upper side, correspond to a thickness of the fed cross-linked foam polyethylene sheet, by a height adjusting means.

7. The apparatus as claimed in claim 1, wherein the cross-linked foam polyethylene sheet has a thickness of 5 mm.

8. The apparatus as claimed in claims 1, wherein an area of the cells formed in the cross-linked foam polyethylene sheet in a widened state has a range of 60 to 80% with respect to $m^2$, and each of the cells formed in the cross-linked foam polyethylene sheet has a size of $2\ cm^2$.

9. The apparatus as claimed in claim 1, wherein a width of a partition wall formed between the cells formed in the cross-linked foam polyethylene sheet is maintained in a range of 3 to 10 mm.

10. An apparatus for manufacturing a heat insulator, the apparatus comprising:

a frame having a feeder provided at front side of the frame for feeding a cross-linked foam polyethylene sheet and a winder provided at rear side of the frame for winding a completed heat insulator;

a cutting part provided at a leading side of the frame, which is for forming multiple cutoff slots in the cross-linked foam polyethylene sheet fed from the feeder;

a widening part provided at a rear side of the cutting part, which is for transforming the cutoff slots into cells by widening a width of the cross-linked foam polyethylene sheet formed with the cutoff slots;

a cooling part provided at a rear side of the widening part, which has cooling rollers to continuously maintain a widened width of the cross-linked foam polyethylene sheet and a shape of the cells transformed from the cutoff slots;

a sheet-attaching part provided at a rear side of the cooling part, which is for attaching an aluminum film on one surface of the widened cross-linked foam polyethylene sheet formed with the cells so as to show high reflectivity and low emissivity; and a 2-sheet-attaching part provided at a rear side of the sheet-attaching part, which is for attaching an aluminum film on one surface of the cross-linked foam polyethylene sheet, which has an aluminum film attached on the opposite surface thereof by direct heat.

11. The apparatus as claimed in claim 10, wherein the 2-sheet-attaching part comprises:

a burner for applying direct heat on one surface of the cross-linked foam polyethylene sheet, which has an aluminum film attached on the opposite surface thereof, drawn out from the sheet-attaching part, thereby melting a surface of the cross-linked foam polyethylene sheet; and a sheet-attaching roller provided between a rear side of the burner and the winder, which is for attaching the aluminum film on a molten surface of the cross-linked foam polyethylene sheet.

12. The apparatus as claimed in claim 10, wherein the cross-linked foam polyethylene sheet has a thickness of 5 mm.

13. The apparatus as claimed in claim 10, wherein an area of the cells formed in the cross-linked foam polyethylene sheet in a widened state has a range of 60 to 80% with respect to $m^2$, and each of the cells formed in the cross-linked foam polyethylene sheet has a size of $2\ cm^2$.

14. The apparatus as claimed in claim 10, wherein a width of a partition wall formed between the cells formed in the cross-linked foam polyethylene sheet is maintained in a range of 3 to 10 mm.

* * * * *